United States Patent [19]

Sugawara

[11] Patent Number: 5,635,826
[45] Date of Patent: Jun. 3, 1997

[54] INPUT WAVEFORM FOLLOW-UP AC POWER SOURCE SYSTEM

[75] Inventor: Isao Sugawara, Warabi, Japan

[73] Assignee: Chiyoda Corporation, Warabi, Japan

[21] Appl. No.: 544,522

[22] Filed: Oct. 18, 1995

[30] Foreign Application Priority Data

Jul. 18, 1995 [JP] Japan ................................. 7-205411

[51] Int. Cl.⁶ .......................... G05F 1/10; G05F 1/40; G05F 5/00; G05F 1/455
[52] U.S. Cl. ................................... 323/300; 323/241
[58] Field of Search ................................ 323/282, 283, 323/284, 285, 299, 237, 239, 241, 300, 320, 322, 324; 363/127

[56] References Cited

U.S. PATENT DOCUMENTS

| | | | |
|---|---|---|---|
| 4,670,828 | 6/1987 | Shekhawat et al. | 363/56 |
| 4,931,716 | 6/1990 | Jovanovic et al. | 323/285 |
| 5,017,800 | 5/1991 | Divan | 307/66 |
| 5,066,900 | 11/1991 | Bassett | 323/224 |
| 5,343,383 | 8/1994 | Shinada et al. | 363/127 |
| 5,404,904 | 4/1995 | Green et al. | 323/282 |
| 5,408,404 | 4/1995 | Mitchell | 363/71 |
| 5,528,480 | 6/1996 | Kikinis et al. | 363/127 |

*Primary Examiner*—Peter S. Wong
*Assistant Examiner*—Bao Q. Vu
*Attorney, Agent, or Firm*—Joseph C. Mason, Jr.; Louise A. Foutch; Murray B. Baxter

[57] ABSTRACT

An input waveform follow-up AC power source system is shown, which can obtain a desired sinusoidal voltage or current wave continuously and with the same or a similar waveform from a constant power source, as well as being small in size and light in weight.

The AC power source system, which provides a desired AC voltage or current from an AC power source, comprises a first AC switch provided between the input side and the output side and on-off operated in a predetermined cycle, and a second AC switch provided on the output side of the first AC switch and at a position to short-circuit the output side and on-off operated conversely to the first AC switch. A predetermined pause time is provided between the operations of the first and second AC switches. Each AC switch has two semiconductor elements, and diodes each connected between controlled terminals of and in opposite conduction polarity to each semiconductor element, like polarity controlled terminals of the two semiconductor elements being connected to each other, the same control signal being supplied to a control input terminal of each semiconductor element for on-off switching AC between the other controlled terminals of the semiconductor elements.

16 Claims, 9 Drawing Sheets

5 — Input filter
6 — Control means
7 — First AC switch
8 — Second AC switch
9 — Output filter
10 — Load 5 ··· Input filter
6 ··· Control means
7 ··· First AC switch
8 ··· Second AC switch
9 ··· Output filter
10 ··· Load FIG.4
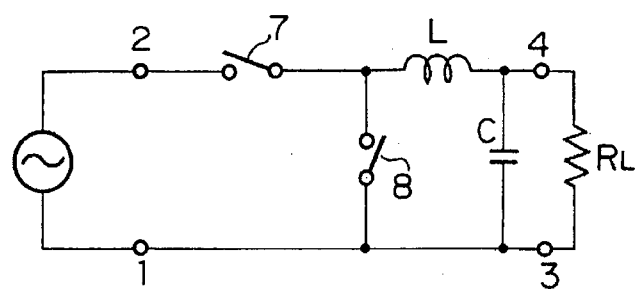
FIG.5A
FIG.5B
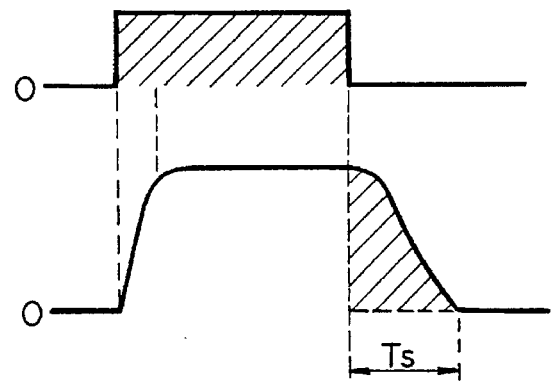
FIG.6A FIG.6B
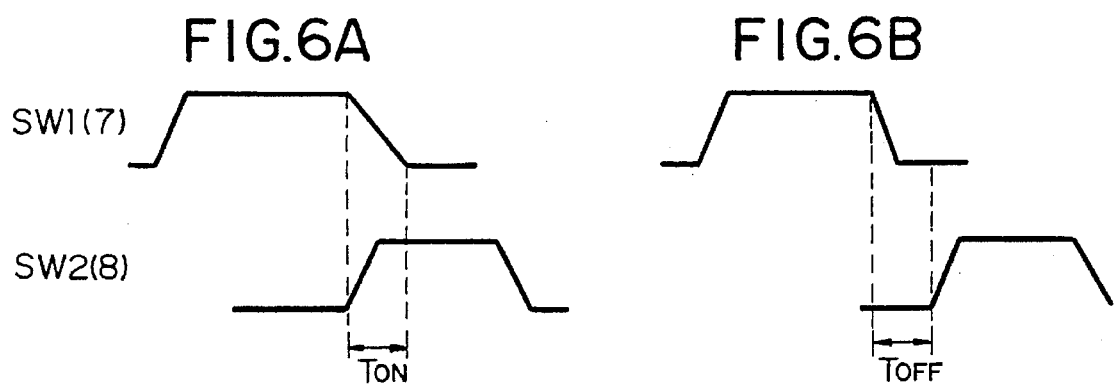
FIG.7
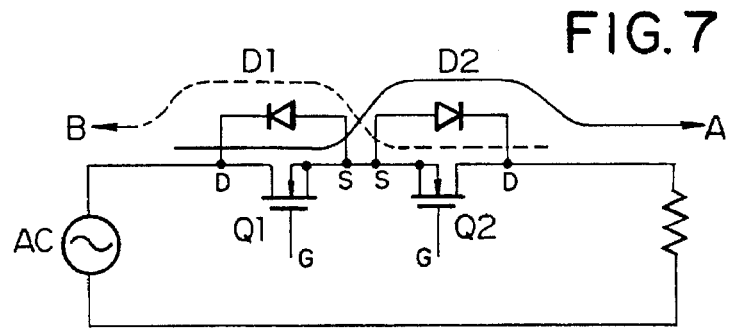

50 %

90 %

5 — Input filter
6 — Control means
7 — First AC switch
8 — Second AC switch
9 — Output filter
10 — Load
11 — Voltage detection means
12 — Boosting means
13 — Transmitting means ST···Slidac transformer SCR1,2 ··· Thyristor
TR1 ··· Triac

INPUT WAVEFORM FOLLOW-UP AC POWER SOURCE SYSTEM

BACKGROUND OF THE INVENTION

Field of the Invention

This invention relates to input waveform follow-up AC power source systems and, more particularly, to AC power sources which receive commercial AC power and can control their output voltage or power continuously from the neighborhood of zero voltage to the neighborhood of the input voltage while holding sinusoidal voltage waveform.
Prior Art FIGS. 14A and 14B show examples of well-known pertaining means for obtaining desired AC voltage or the like from commercial AC power. In the FIG. 14A example, AC power input between terminals 1 and 2 is converted to a desired voltage using a slidac transformer ST. In the FIG. 14B example, a triac TR1 is used for phase angle control of the input power, or thyristors SCR1 and SCR2 are used to provide an AC source which is applied to light controllers or electric furnace control.

The slidac ST permits obtaining a continuously variable sinusoidal output and finds extensive applications to equipment for researches and experiments. On the demerit side, since it is principally an auto-transformer used for commercial frequencies, it is large in volume and heavy in weight. Beside, it has resort to the sliding of coils for voltage variation, resulting in the generation of an inter-coil step voltage. Therefore, it is impossible to obtain perfectly continuously variable voltage. A further demerit is its high price.

The power source using the triac TR1 is small in size, light in weight and inexpensive, so that it is extensively applied to illumination units and electric furnaces as well as household devices. However, lagging power factor always results from reduction of current, voltage or power for the phase angle control. This gives rise to the generation of the third and higher odd harmonic waves by about 30% of the fundamental AC component at phase angle of 90° these harmonic components being liable to leak to the commercial power source line so as to adversely affect other electronic devices. Actually, this power source is a subject of harmonic wave restriction. In addition, the reduction of the power factor increases ineffective power, which is a problem from the standpoint of energy saving.

SUMMARY OF THE INVENTION

This invention was made in the light of the foregoing, and its object is to provide an input waveform follow-up AC power source system, which permits desired voltage or current of a sinusoidal or like waveform to be obtained continuously with the same or similar waveform from a fixed power source, as well being small in size and light in weight.

An AC power source system which is provided to attain the above object of the invention and converts input AC to a desired AC voltage or current, comprises a first AC switch provided between the input and output sides and on-off operated with a predetermined cycle and a second AC switch provided on the output side of the first AC switch and at a position to short-circuit the output side and on-off operated substantially with the opposite timings with respect to the first AC switch.

The AC power source system further comprises pair input terminals between which an AC power source is connected, and a pair output terminals between which a load is connected. One of the input terminals and one of the output terminals are connected to a common line. The other input terminal is connected through a filter to the common line and one terminal of the first AC switch. The other output terminal is connected through an output filter the other terminal of the first AC switch and one terminal of the second AC switch. The output filter is further connected to the common line. The other terminal of the second AC switch is connected to the common line.

A predetermined pause time is provided between the operations of the first and second AC switches.

The two AC switches each have two semiconductor elements and also two diodes connected between controlled terminals of and in opposite polarity to the conduction of the respective semiconductor elements, like polarity controlled terminals of the semiconductor elements being connected to each other, the same control signal being supplied to control input terminals of the semiconductor elements for turning on and off AC between the other controlled terminals of the semiconductor elements.

Control means which drives the first and second AC switches, perform PWM control (or time ratio control) to hold output voltage or current constant through input voltage detection.

BRIEF DESCRIPTION OF THE DRAWINGS

The above and other objects, features and advantages of the invention will become more apparent from the detailed description of the preferred embodiments when the same is read with reference to the accompanying drawings, in which:

FIG. 4 is a circuit diagram showing the basic structure of the system according to the invention;

FIG. 5A is a waveform diagram showing a control signal in storage time;

FIG. 5B is a view similar to FIG. 5A but showing a controlled signal;

FIG. 6A is a timing chart showing operation timings of a first and a second AC switch in case when a short-circuit state is brought about;

FIG. 6B is a view similar to FIG. 6A but in case when an open-circuit state is brought about to generate a spike voltage;

FIG. 7 is a view showing the structure and operation of AC switch in detail;

DETAILED DESCRIPTION OF THE PREFERRED EMBODIMENTS

Figure 1:
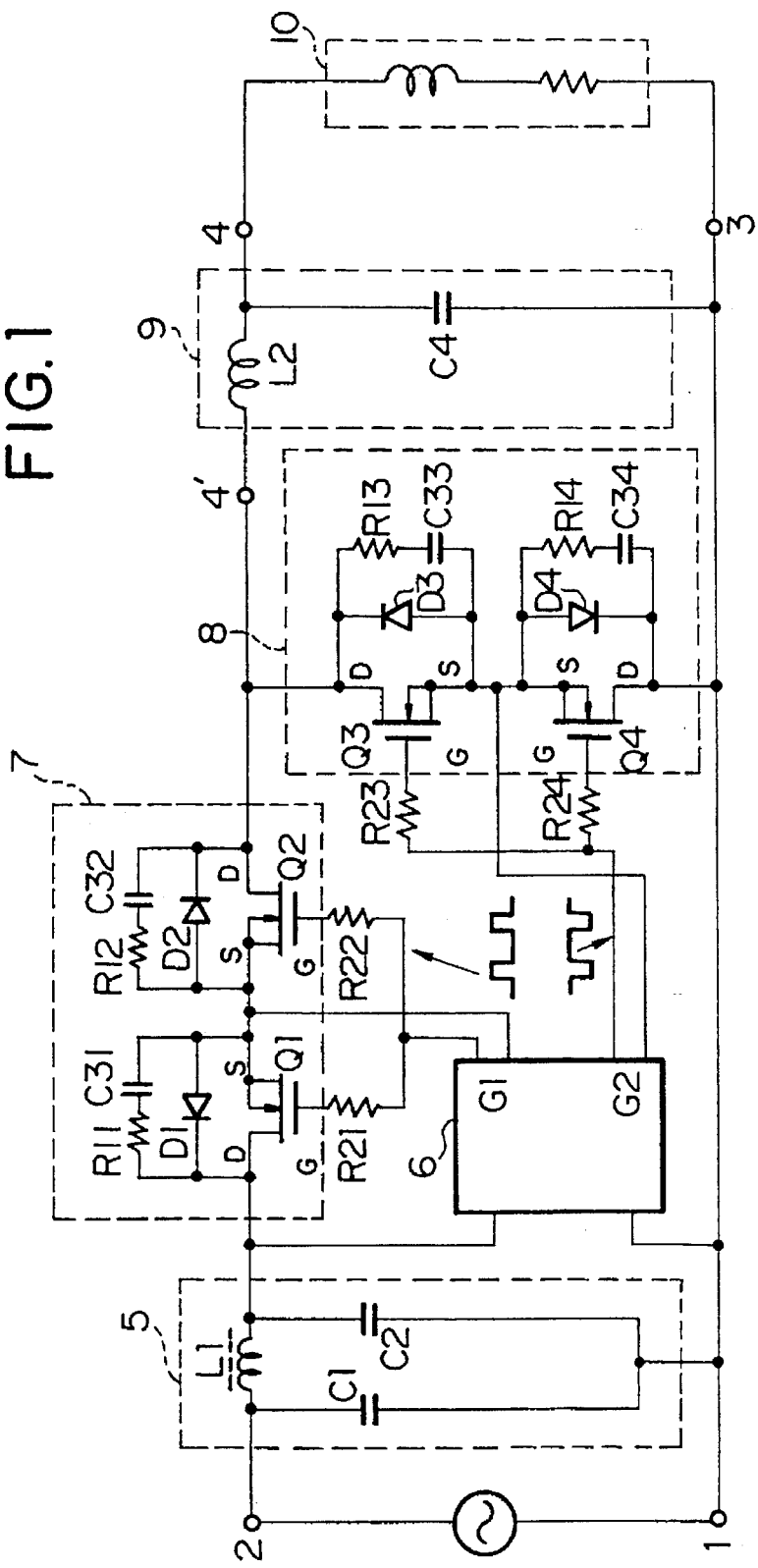
FIG. 1 is a circuit diagram showing the basic structure of input waveform follow-up AC power source system embodying the invention.

Preferred embodiments of the invention will now be described with reference to the drawings. FIG. 4 shows a circuit diagram of the basic structure underlying the input waveform follow-up AC power supply system according to the invention. Referring to the Figure, designated at AC is a commercial AC power source, at 1 and 2 input terminals, at 7 and 8 a first and a second AC switch, at L and C a coil and a capacitor, respectively, of an output filter, at 3 and 4 output terminals, and at RL a load.

The first and second AC switches 7 and 8 each comprise a semiconductor element (for instance MOS FET) on-off operable at high speed. These switches 7 and 8 operate substantially conversely to each other. The first AC switch 7 high speed switches AC input from the input terminals 1 and 2 at a sufficiently high frequency compared to the input frequency (desirably above the audio frequency range). During the "off" time of the first AC switch 7, the second AC switch 8 is "on" to release energy stored in the coil L. In this way, a commonly termed flywheel effect can be obtained.

The switching operation of the first and second AC switches 7 and 9, i.e., the "on" time of the first AC switch 7, can be controlled to obtain a desired AC voltage output in a low voltage range compared to the input AC voltage.

With a usual semiconductor element such as a transistor or a FET, as shown in FIGS. BA and 5B, the controlled current waveform (FIG. BB) lags behind the control voltage (or current) waveform (FIG. 5A). In this situation, the operation during time Ts (FIG. 5B), during which the controlled current is present after the control voltage has been turned off, poses a problem. This time deviation in operation is due to the release of charge stored in the control electrode, and usually referred to as storage.

Actually, such storage time may bring about a short-circuit with both the first and second AC switches 7 and 8 turned on during time TON, as shown in FIG. 6A, despite a time difference provided between the operations of the two AC switches 7 and 8. If the operations of the AC switches 7 and 8 are spaced apart sufficiently, as shown in FIG. 6B, on the other hand, an open-circuit may be brought about during time TOFF. In this case, a surge voltage is generated due to the reactance component and increases the snubber circuit loss to readily cause heat generation or seizure. Increasing the capacitance is a coping measure. Doing so, however, leads to increased size of components and circuits.

To solve the above problems, a pause time is provided between the operations of the first and second AC switches 7 and 8, and it is controlled to an optimum value according to the maximum load or capacitance. By so doing, the surge voltage can be minimized without possibility of producing any short-circuit.

The structure of the AC switches 7 and 8 will now be described in detail. FIG. 7 shows the structure and operation of the AC switches 7 and 8 in detail. The illustrated AC switch has two semiconductor elements Q1 and Q2 used for current control or the like. These semiconductor elements Q1 and Q2 can not pass AC alone because it is their controlled terminals that provides for the polarity of conduction. Diodes D1 and D2, accordingly, are each provided between the controlled terminals of and in opposite polarity of conduction to each of the semiconductor elements Q1 and Q2. The semiconductor elements Q1 and Q2 have their like polarity terminals connected to each other, and the same control signal is supplied as control input to them. This system operates as an AC switch.

In this embodiment, n-channel MOS FET's are used as the semiconductor elements Q1 and Q2. More specifically, the drain of each MOS FET is the cathode, and the diode noted above which is a high speed diode is connected between the source and drain. These MOS FET's Q1 and Q2 have their sources connected to each other, and AC is applied between their drains. A common control signal is impressed on the gate of each of these MOS FET's Q1 and Q2. Thus, the system serves as semiconductor AC switch to pass current, for instance, through the MOS FET Q1 and diode D2 as shown by solid line arrow A during the positive half cycle of AC and through the MOS FET Q2 and diode D1 during the negative half cycle.

This semiconductor element, used as each of the AC switches 7 and 8, permits high speed operation, as well as improving the efficiency because of its low "on" resistance.

Specific Embodiments

Now, specific preferred embodiments of the invention will be described. FIG. 1 is a circuit diagram showing one embodiment of the input waveform follow-up AC power source system according to the invention. Referring to the Figure, designated at 1 and 2 are input terminals between which a predetermined AC power source is connected, at 3 and 4 output terminals between which a load is connected, at 5 an input filter, at 6 a control means for controlling a first and a second AC switch 7 and 8, at 9 an output filter which has characteristics of a high frequency filter, and at 10 a load.

The first AC switch 7 has two n-channel MOS FET's Q1 and Q2 with the drains thereof on the cathode side and the sources connected in series, diodes D1 and D2 each connected between the source and drain of each MOS FET, and series circuit having resistors R11 and R12 and series capacitors C31 and C32, respectively, and each connected in parallel with each of the diodes D1 and D2. With this arrangement, which functions as a snubber circuit, AC control can be obtained between the drains of the two MOS FET's Q1 and Q2 as controlled terminals by supplying a common control signal to each of the gates of the MOS FET's Q1 and Q2. The second AC switch 8 has the same structure, with MOS FET's Q4 and QS which diodes D3 and D4 are connected to, resistors R13 and R14 and capacitors C33 and C34 form a snubber circuit.

The input waveform follow-up AC power source system having the above structure is connected as follows. The input terminal 1 as one of the pair input terminals 1 and 2 and the output terminal 3 as one of the pair output terminals 3 and 4, are connected to common line. The other input terminal 2 is connected to one terminal of choke coil L1 of the input filter 5. The other terminal of the choke coil L1 is connected one controlled terminal of the first AC switch 7 and also to one power input terminal of the control means 6. The other power input terminal of the control means 6 is connected to the common line.

The input filter 5 has capacitors C1 and C2 each having one terminal connected to each terminal of the choke coil L1 and the other terminal connected to the common line. The other controlled terminal of the first AC switch 7 is connected to one terminal of one controlled terminal of the second AC switch 8 and also to one terminal of coil L2 in the output filter 9. The other controlled terminal of the second AC switch 8 is connected to the common line.

The output filter 9 has the coil L2 having the other terminal connected to the other output terminal 4 and capacitor C4 having one terminal connected to the other terminal of the coil L2 and the other terminal connected to the common line. In this example, the output filter 6 has characteristics of a high frequency filter which can remove harmonic components by chopper action. The output terminal 3 noted first is connected to the common line. Load 10 is connected between the output terminals 3 and 4. The load 10 is shown as having a lagging power factor due to a resistive and an inductive component. However, it is possible to connect a capacitive load having a leading power factor as well.

The control means 6 has two control output terminal pairs G1 and G2. One terminal of the control output terminal pair G1 is connected through resistors R21 and R22 to the gates of the MOS FET's Q1 and Q2 of the first AC switch 7. One terminal of the control output terminal pair G2 is connected through resistors R23 and R24 to the gates of MOS FET's Q3 and Q4 of the second AC switch 8. The other terminal of the terminal pair G1 is connected between the sources of the MOS FET's Q1 and Q2 of the first AC switch 7. The other terminal of the terminal pair G2 is connected between the sources of the MOS FET's Q3 and Q4 of the second AC switch 8.

Figure 2:
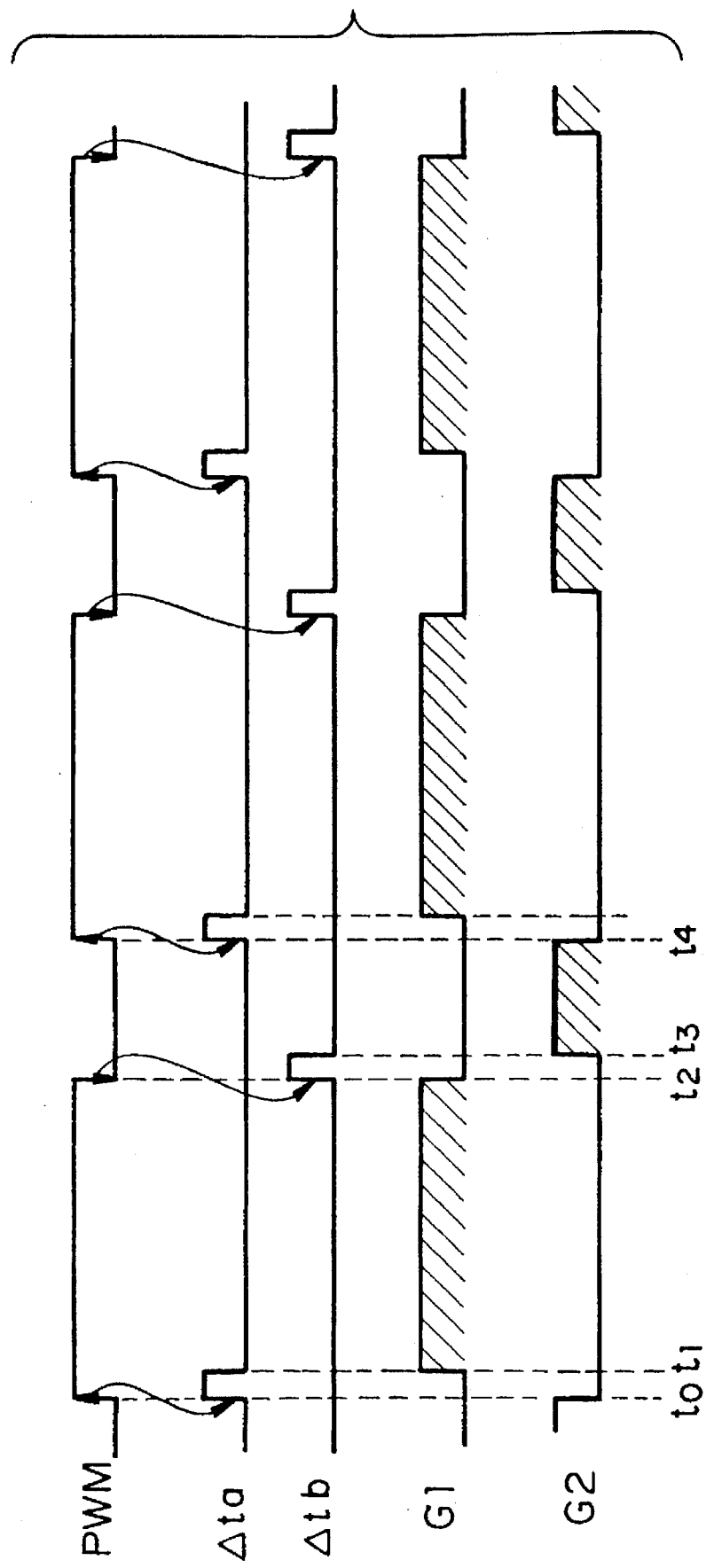
FIG. 2 is a timing chart showing the timings of control outputs.

The operation of the control outputs G1 and G2 of the control means 6 will now be described with reference to FIG. 2, which is a timing chart showing an example of the control outputs. The control means 6 extracts a synchronizing signal from its AC input and internally generates a PWM signal, as shown, to provide a constant output voltage.

With inversion of the PWM signal to "H" level at instant t0, a signal which provides pause time Δta of the first AC switch 7 is inverted to "H" level. At this time, the control output G1 remains at "L" level. With inversion of the pause signal Δta to "L" level at instant t1, the control output G1 is inverted to "H" level. With inversion of the PWM signal to "L" level at instant t2, the signal G1 which is of the same phase is also inverted to "L" level, causing inversion of a signal providing pause time Δtb of the second AC switch 8 to "H" level. At this time, the other control output Gt, which is the inversion of the PWM signal, remains at "L" level. With inversion of the pause time signal Δtb to "L" level after the lapse of this pause time at instant t3, the output G2 is inverted to "H" level. With inversion of the PWM signal to "H" level at instant t4, the other output G2 is inverted to "L" level. The above cycle of signals is repeated.

Figure 3:
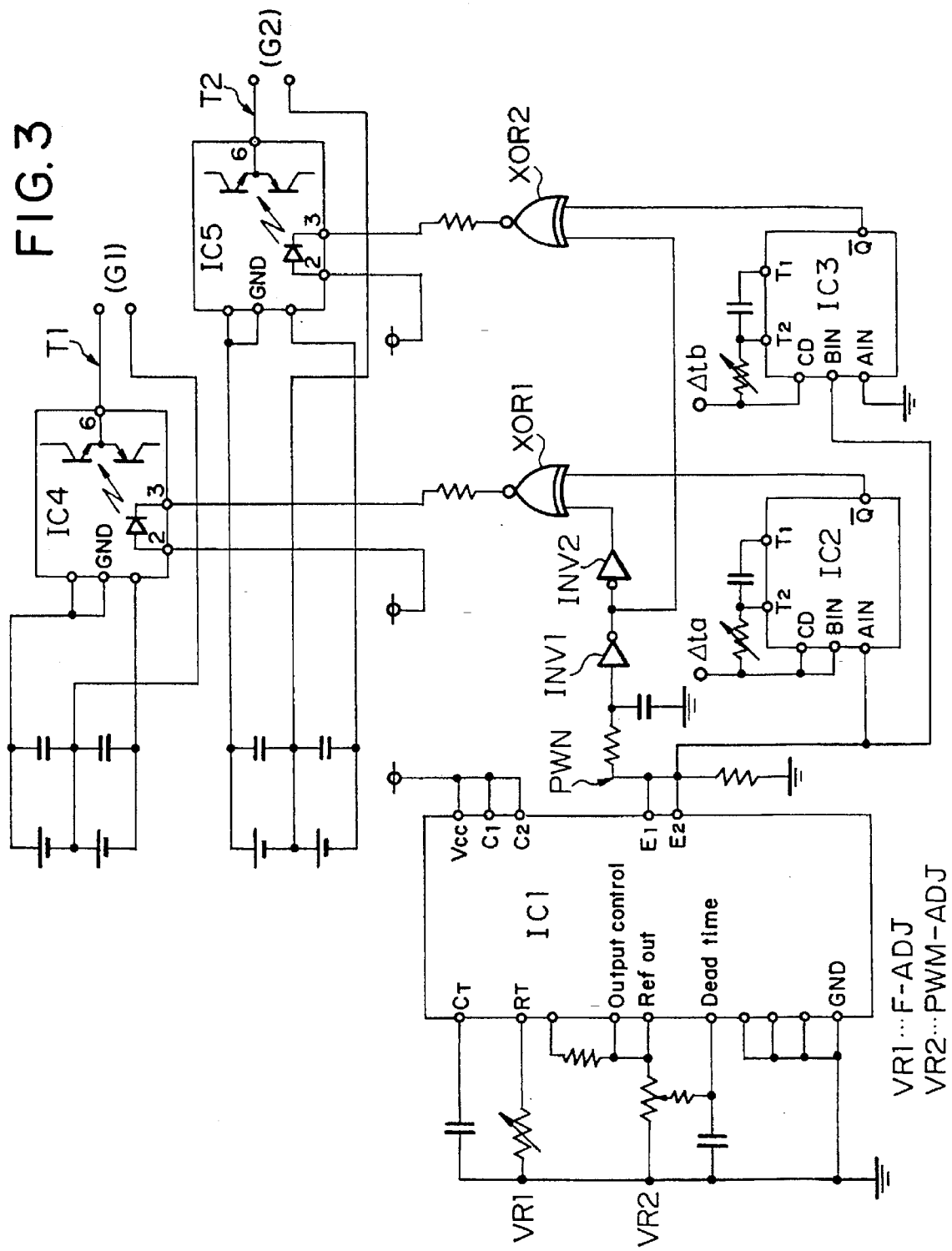
FIG. 3 is a circuit diagram showing an example of control part in detail.

FIG. 3 is a circuit diagram showing an example of the control means 6 in detail, which will now be described. Integrated circuit IC1 is a well-known PWM control IC for generating the PWM signal. (In this example, "PC494" is used.) Variable resistor VR1 is a frequency setter. Variable resistor VR2 is for controlling the PWM signal. Integrated circuits IC2 and IC3 are mono-stable multivibrators ("TC4528RP", for instance), which prescribe the pause times Δta and Δtb, respectively. Integrated circuits IC4 and IC5 are photo-couplers ("PC923", for instance) for MOS FET driving.

The PWM signal is provided from between terminals E1 and E2 of the integrated circuit IC1. From this signal, a positive logic signal is produced through inverters INV1 and INV2, and a negative logic signal from the sole inverter INV1. The signal PWM is also supplied as positive logic input AIN to the mono-stable multi-vibrator IC2 and to negative logic input BIN of the mono-stable multivibrator IC3 to cause one-shot pulses Δta and Δtb having a prescribed duration to be produced at its rise and fall. The positive logic signal and the output of the circuit IC2 are supplied to exclusive OR gate XOR1, and the negative logic input and the output of the circuit IC3 are supplied to exclusive OR gate XOR2. Outputs of the gates XOR1 and XOR2 drive the light emission side of the photo-couplers IC4 and IC5, which thus provide the signals G1 and G2 as their outputs.

In the above way, the control signals G1 and G2 with which to drive the first and second AC switches 7 and 8, are produced by combining the pause time signals Δta and Δtb with the PWM signal. The signals Δta and Δtb are readily adjustable with variable resistors connected between terminals T2 and CD of the circuits IC2 and IC3.

Figure 8A:
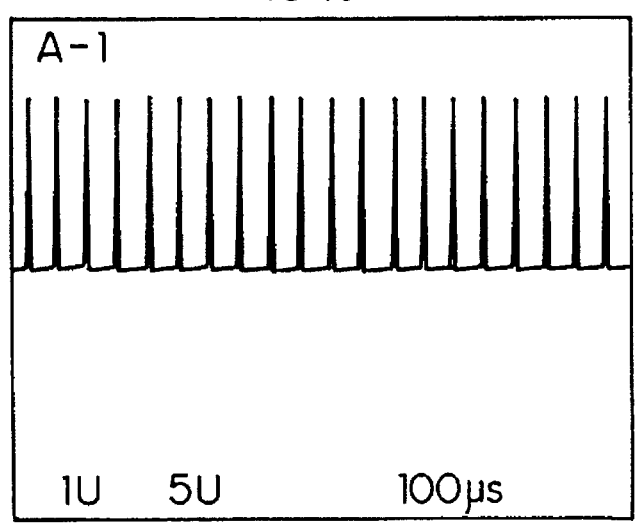
FIG. 8A is a waveform diagram showing the waveform in an enlarged frequency range at a node on the input side of an output filter in case of a 10% control output time ratio.
Figure 8B:
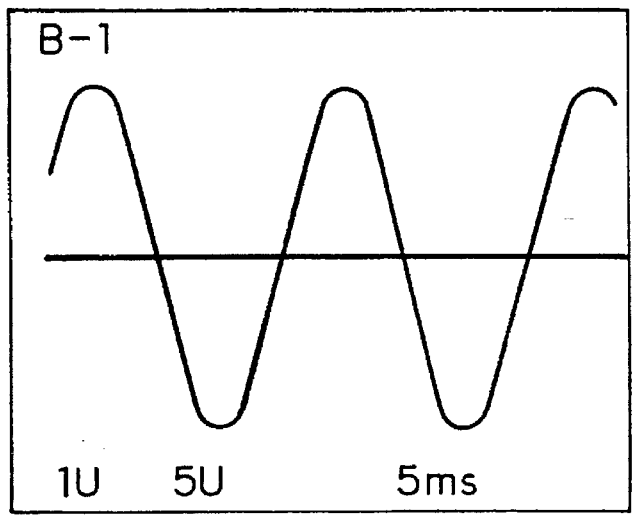
FIG. 8B is a waveform diagram showing like waveform in the normal frequency range.
Figure 8C:
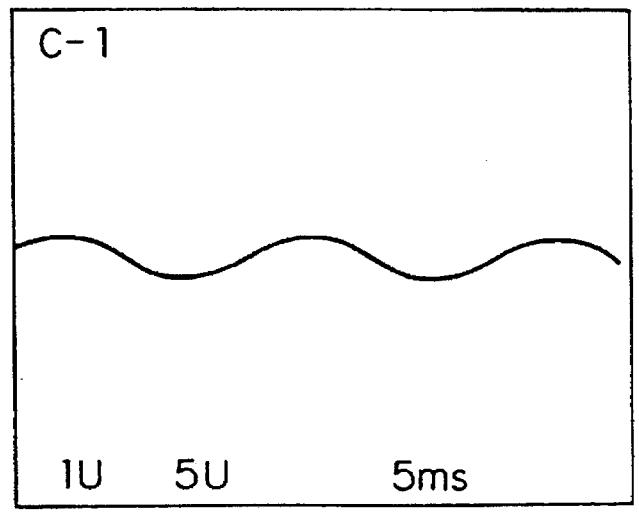
FIG. 8C is a waveform diagram showing the waveform at an output terminal.
Figure 9A:
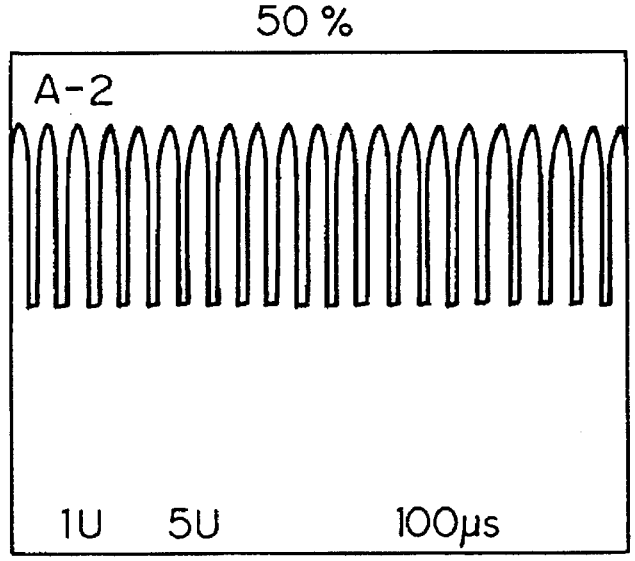
FIG. 9A is a waveform diagram showing the waveform in the enlarged frequency range at the output filter input side node in case of a 50% control output time ratio.
Figure 9B:
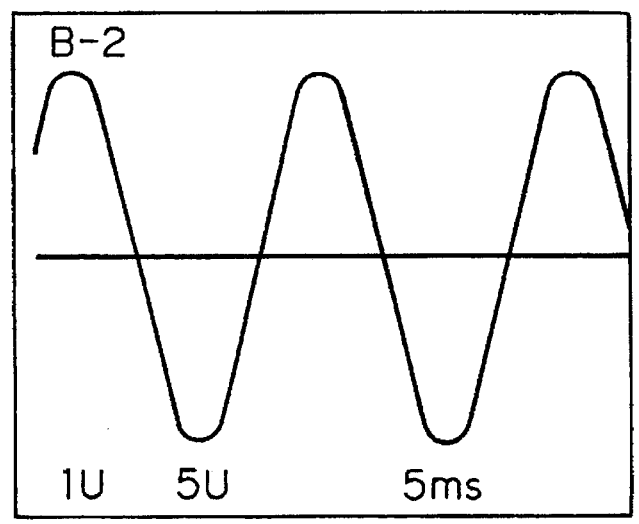
FIG. 9B is a waveform diagrams showing like waveform in the normal frequency range.
Figure 9C:
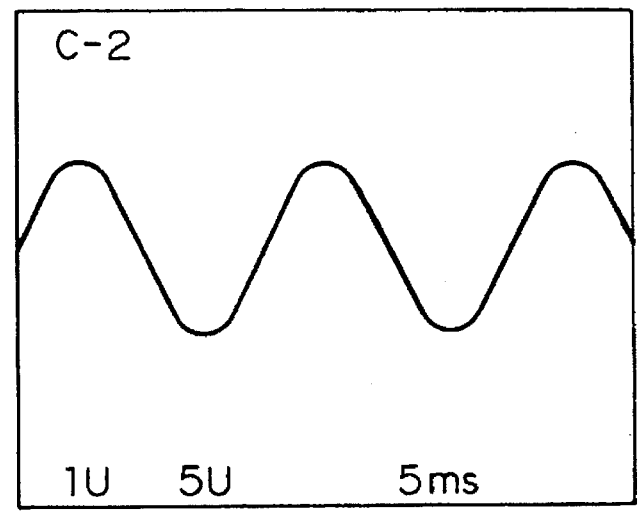
FIG. 9C is a waveform diagram showing the waveform at the output terminal.
Figure 10A:
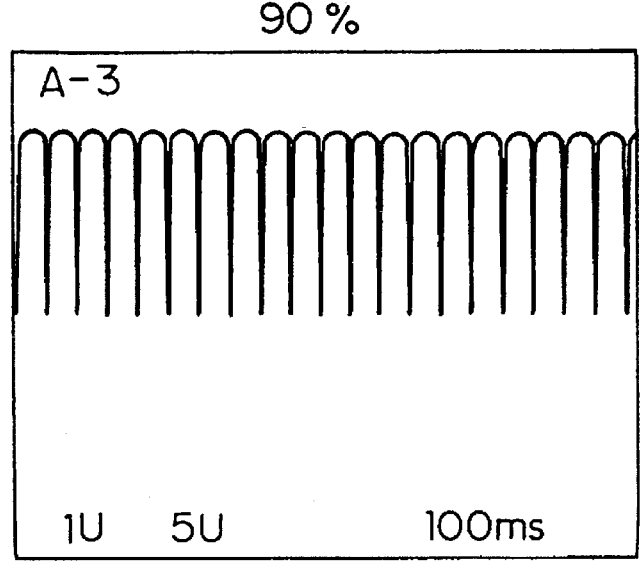
FIG. 10A is waveform diagram showing the waveform in the enlarged frequency range at the output filter input side node in case of a 90% control output time ratio.
Figure 10B:
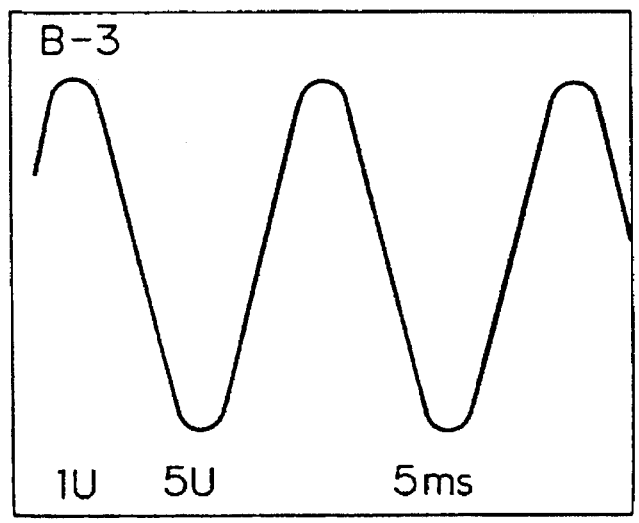
FIG. 10B is a waveform diagram showing like waveform in the normal frequency range.
Figure 10C:
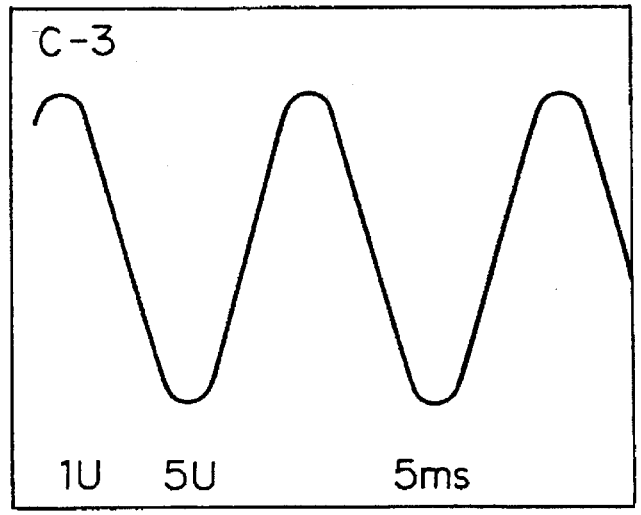
FIG. 10C is a waveform diagram the waveform at the output terminal.

FIGS. 8A to 8C, 9A to 9C and 10A to 10C show waveforms appearing in various parts of the input waveform follow-up AC power source system having the above structure. FIGS. 8A to 8C concern a case when the time ratio of the control output G1 is set to 10%, FIGS. 9A to 9C concern a case with a time ratio of 50%, and FIGS. 10A to 10C concern a case with a time ratio of 90%. In the graphs of FIGS. 8A, 9A and 10A, the frequency range is enlarged to permit understanding of the chipper operation with waveform at node 4' in front of the output filter 9. In the graphs of FIGS. 8A, 9B and 10B, the frequency range is not changed to permit comparison of the output AC waveforms as waveform at the node 4'. In the graphs of FIGS. 8C, 9C and 10C, output waveforms at the output terminal 4 are shown. It will be seen that the input waveform is chopped with a predetermined time ratio, and a similar voltage waveform corresponding to the time ratio appears as the output.

Figure 11:
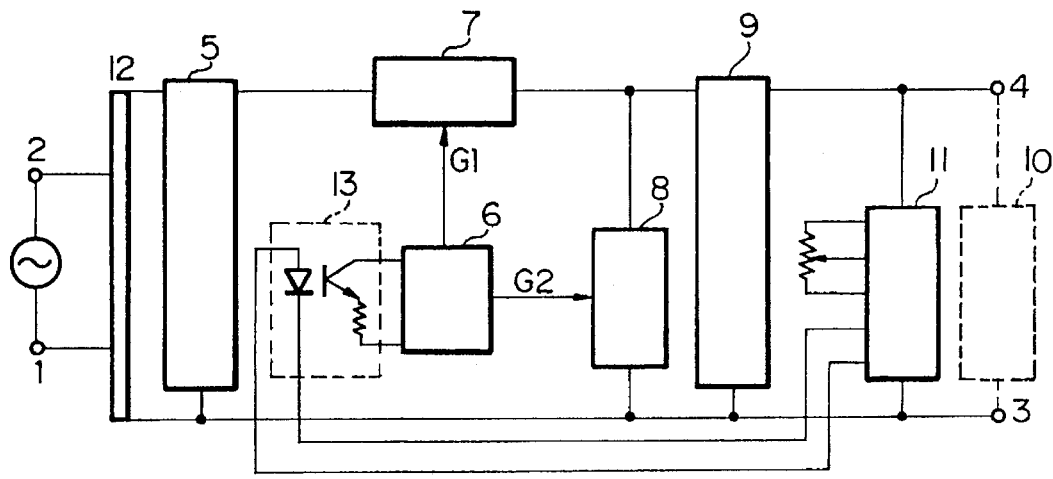
FIG. 11 is a block diagram showing the basic structure of a second embodiment of the system according to the invention.

A second and a third embodiment of the invention will now be described with reference to FIGS. 11 to 13. FIG. 11 shows the second embodiment of the invention. In this embodiment, a voltage detection means 11, which is a wellknown means, is provided between output filter 9 and output terminals 3 and 4. The voltage detection means 11 checks whether a predetermined voltage prevails, and its output is supplied as feed-back signal through transmitting means 13 such as a photo-coupler to control means 6 for constant voltage control. If necessary, a boosting means such as a transformer may be provided to obtain a higher voltage than the input voltage. It is further possible to obtain current or power control with well-known means which utilizes such voltage control.

Figure 12:
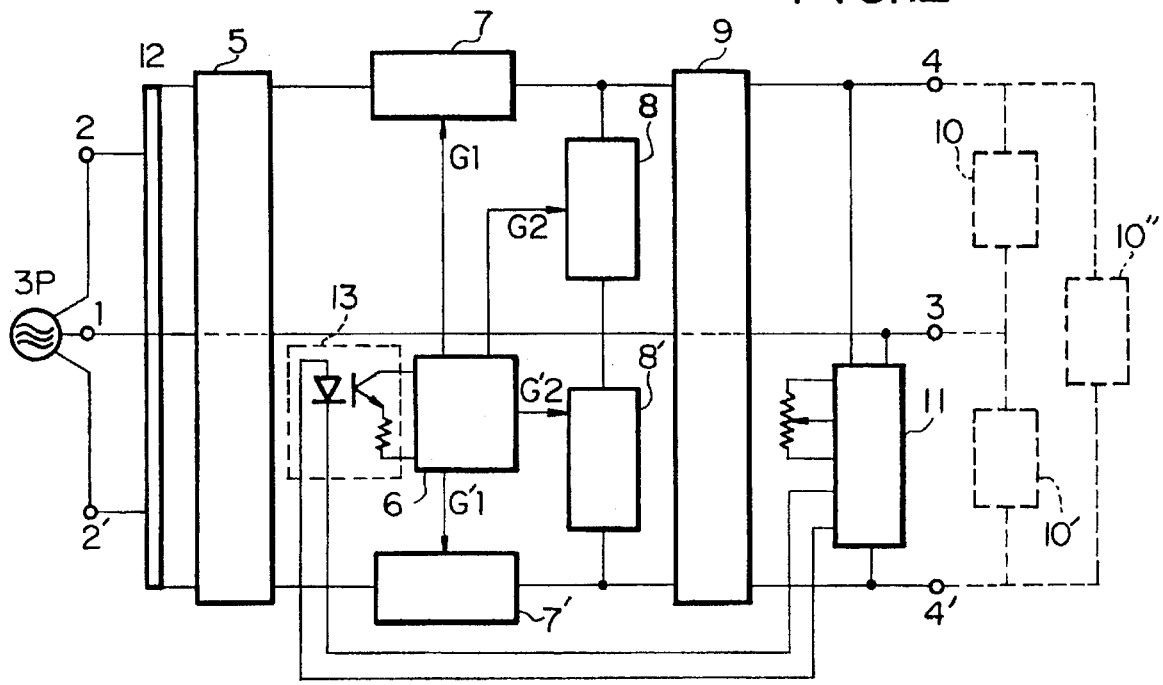
FIG. 12 is a block diagram showing the basic structure of a third embodiment of the invention applied to a threephase input waveform follow-up AC power supply system.
Figure 14A:
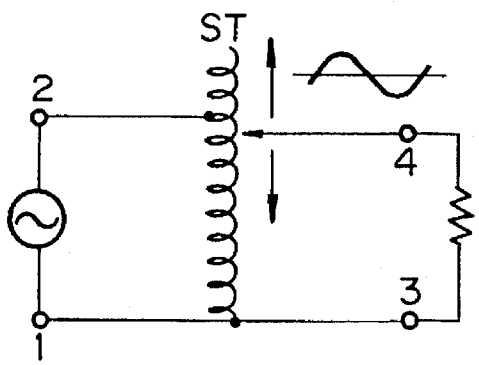
FIGS. 14A and 14B are circuit diagrams showing examples of prior art AC power source system, FIG. 14A showing a system employing a slidac transformer, FIG. 14B showing a system employing a triac or a thyristor.
Figure 14B:
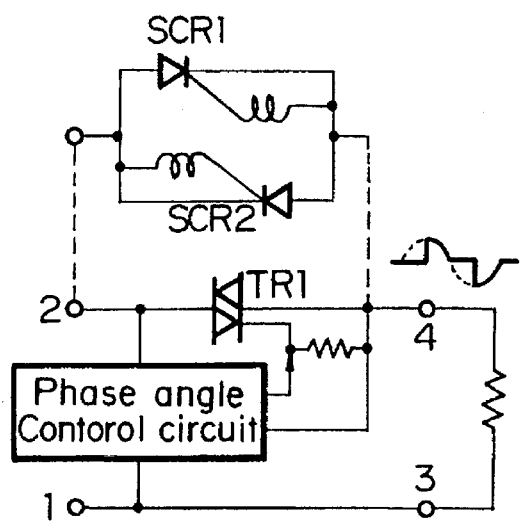

FIG. 12 shows the third embodiment of the invention. In this embodiment, the invention is applied to a three-phase AC power source system. The system comprises two circuits as shown in FIG. 1. Control means 6, voltage detection means 11 and transmitting means 13 are common to the two circuits, and the control means 6 provides control signals G1, G2, G'1 and G'2.

Figure 13:
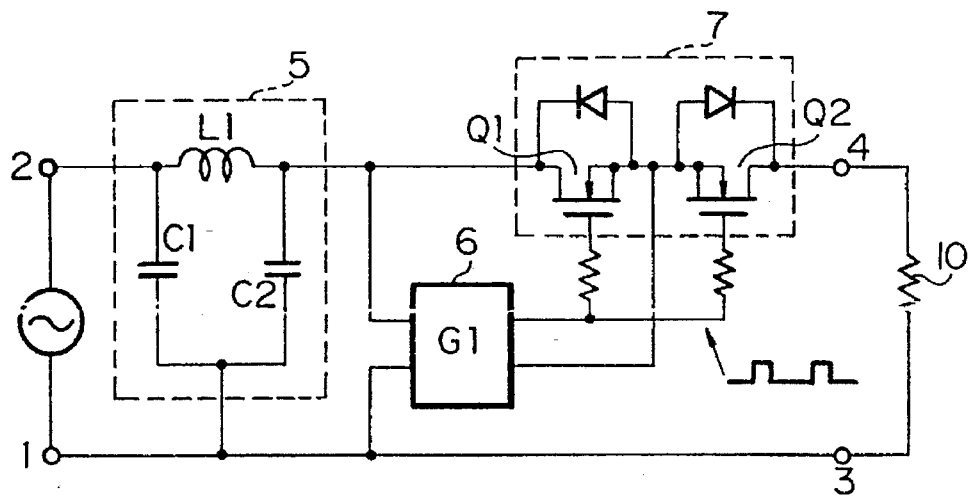
FIG. 13 is a circuit diagram showing the basic structure of a fourth embodiment of the invention applied to a 100% load power factor power source system.

FIG. 13 shows an application of the invention to a power source system for driving a 100% power factor load such as a pure resistance component (for electric furnace controller and light controller, for instance). In this system, the second AC switch 8 is dispensed with. The omission of the second AC switch 7 is possible because the spike voltage that is generated between the controlled terminals (i.e., drains) of the first AC switch 7 is very slight and ignoreable owing to approximately 100% power factor of the load 10.

As has been described in the foregoing, according to the invention two alternately operable AC switches are provided for chopper operation and flywheel operation, and it is possible to obtain a desired sinusoidal wave of voltage or current continuously in the same or a similar waveform from a fixed power source with a small-size and light-weight power source system.

In addition, with the provision of a pause time between the operations of the individual AC switches, it is possible to minimize the spike voltage that is generated with the switching operation.

Further, each AC switch has two semiconductor elements, and diodes each connected between controlled terminals of and in opposite conduction polarity to each semiconductor element, like polarity controlled terminals of the two semiconductor elements are connected to each other, and the same control signal is supplied to a control input terminal of each semiconductor element for on-off switching AC between the other controlled terminals of the two semiconductor elements.

What is claimed is:

1. An input waveform follow-up AC power source system capable of directly on-off switching an input AC for providing a desired AC voltage, comprising:

a first AC switch provided between the input side and the output side and on-off operated in a predetermined cycle; and a second AC switch provided on the output side of the first AC switch and at a position to short-circuit the output side and on-off operated substantially conversely to the first AC switch.

2. The input waveform follow-up AC power source system according to claim 1, wherein a predetermined pause time is provided between the operations of the first and second AC switches.

3. The input waveform follow-up AC power source system according to claim 1, wherein each AC switch has two semiconductor elements, and diodes each connected between controlled terminals of and in opposite conduction polarity to each semiconductor element, like polarity controlled terminals of the two semiconductor elements being connected to each other, the same control signal being supplied to a control input terminal of each semiconductor element for on-off switching AC between the other controlled terminals of the two semiconductor elements.

4. The input waveform follow-up AC power source system according to claim 2, wherein each AC switch has two semiconductor elements, and diodes each connected between controlled terminals of and in opposite conduction polarity to each semiconductor element, like polarity controlled terminals of the two semiconductor elements being connected to each other, the same control signal being connected to each other, the same control signal being supplied to a control input terminal of each semiconductor element for on-off switching AC between the other controlled terminals of the two semiconductor elements.

5. The input waveform follow-up AC power source system according to claim 1, wherein the control means for driving the first and second AC switches performs a PWM control (time ratio control) operation of detecting the input voltage and holding the output voltage or current constant.

6. The input waveform follow-up AC power source system according to claim 2, wherein the control means for driving the first and second AC switches performs a PWM control (time ratio control) operation of detecting the input voltage and holding the output voltage or current constant.

7. The input waveform follow-up AC power source system according to claim 3, wherein the control means for driving the first and second AC switches performs a PWM control (time ratio control) operation of detecting the input voltage and holding the output voltage or current constant.

8. The input waveform follow-up AC power source system according to claim 4, wherein the control means for driving the first and second AC switches performs a PWM control (time ratio control) operation of detecting the input voltage and holding the output voltage or current constant.

9. The input waveform follow-up AC power source system according to claim 1, which further comprises a pair of input terminals between which a predetermined AC power source is connected and a pair of output terminals between which a predetermined load is connected, one of the input terminals and one of the output terminals being connected to a common line, one terminal of the second AC switch being connected to the common line between the input filter terminal and the output terminal, the other input terminal being connected through an input filter to the common line and also being connected to one terminal of the first AC switch, the other output terminal being connected through an output filter to the common line and also being connected to the other terminal of the first AC switch and the other terminal of the second AC switch.

10. The input waveform follow-up AC power source system according to claim 9, wherein a predetermined pause time is provided between the operations of the first and second AC switches.

11. The input waveform follow-up AC power source system according to claim 9, wherein each AC switch has two semiconductor elements, and diodes each connected between controlled terminals of and in opposite conduction polarity to each semiconductor element, like polarity controlled terminals of the two semiconductor elements being connected to each other, the same control signal being supplied to a control input terminal of each semiconductor element for on-off switching AC between the other controlled terminals of the two semiconductor elements.

12. The input waveform follow-up AC power source system according to claim 10, wherein each AC switch has two semiconductor elements, and diodes each connected between controlled terminals of and in opposite conduction polarity to each semiconductor element, like polarity controlled terminals of the two semiconductor elements being connected to each other, the same control signal being supplied to a control input terminal of each semiconductor element for on-off switching AC between the other controlled terminals of the two semiconductor elements.

13. The input waveform follow-up AC power source system according to claim 9, wherein the control means for driving the first and second AC switches performs a PWM control (time ratio control) operation of detecting the input voltage and holding the output voltage or current constant.

14. The input waveform follow-up AC power source system according to claim 10, wherein the control means for driving the first and second AC switches performs a PWM control (time ratio control) operation of detecting the input voltage and holding the output voltage or current constant.

15. The input waveform follow-up AC power source system according to claim 11, wherein the control means for driving the first and second AC switches performs a PWM control (time ratio control) operation of detecting the input voltage and holding the output voltage or current constant.

16. The input waveform follow-up AC power source system according to claim 12, wherein the control means for driving the first and second AC switches performs a PWM control (time ratio control) operation of detecting the input voltage and holding the output voltage or current constant.

* * * * *

UNITED STATES PATENT AND TRADEMARK OFFICE
CERTIFICATE OF CORRECTION

PATENT NO. : 5,635,826
DATED : June 3, 1997
INVENTOR(S) : Isao Sugawara

It is certified that error appears in the above-indentified patent and that said Letters Patent is hereby corrected as shown below:

In Column 8, Line 31, delete the word -filter- after the word input.

Signed and Sealed this

Third Day of February, 1998

Attest:

BRUCE LEHMAN

Attesting Officer

Commissioner of Patents and Trademarks